US009342325B2

(12) United States Patent
Barat et al.

(10) Patent No.: US 9,342,325 B2
(45) Date of Patent: May 17, 2016

(54) SYNCHRONIZING LAUNCH-CONFIGURATION INFORMATION BETWEEN FIRST AND SECOND APPLICATION ENVIRONMENTS THAT ARE OPERABLE ON A MULTI-MODAL DEVICE (75) Inventors: Nirmalya Barat, Cupertino, CA (US); Parikshit Dharawat, Sunnyvale, CA (US); Vamshika R. Gangam, San Jose, CA (US); Ji Hye Jung, Palo Alto, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 169 days.

(21) Appl. No.: 13/474,204

(22) Filed: May 17, 2012

(65) Prior Publication Data

US 2013/0311682 A1 Nov. 21, 2013

(51) Int. Cl.
G06F 15/177 (2006.01)
G06F 9/445 (2006.01)
(Continued)

(52) U.S. Cl.
CPC ............ G06F 9/44505 (2013.01); *G06F 9/445* (2013.01); *G06F 3/0647* (2013.01); *G06F 13/102* (2013.01); *G06F 15/16* (2013.01)

(58) Field of Classification Search
CPC ....... G06F 9/455; G06F 13/102; G06F 15/16; G06F 9/4411; G06F 9/4443; G06F 3/0647
USPC .......................................................... 710/14
See application file for complete search history.

(56) References Cited

U.S. PATENT DOCUMENTS 5,119,494 A 6/1992 Garman
5,446,904 A 8/1995 Belt et al.
(Continued)

FOREIGN PATENT DOCUMENTS

CN 101025701 A 8/2007
CN 101051282 A 10/2007
(Continued)

OTHER PUBLICATIONS

Patent Cooperation Treaty, "PCT Search Report and Written Opinion of the International Searching Authority" for International Application No. PCT/US2013/037283 dated Jul. 26, 2013, 8 pages.
(Continued)

*Primary Examiner* — Henry Tsai
*Assistant Examiner* — John Roche
(74) *Attorney, Agent, or Firm* — McDermott Will & Emery LLP (57) ABSTRACT A method for a multi-modal device for transferring launch information for a panel and first docking bar in a first application environment to a second application environment for a second docking bar in the second application environment includes detecting a docking of the multi-modal device to a hardware module, and displaying a user interface for the second application environment operating on the multi-modal device on the hardware module. The method includes receiving at the second application environment the launch information for launching launchable objects in the first application environment from the second application environment, and parsing, by the second application environment, the launch information to determine a change to the panel or the first docking bar. The change is in the first application environment. The method includes changing the second docking bar to include the change to the panel or the first docking bar based on parsing the launch information.

19 Claims, 4 Drawing Sheets (51) Int. Cl.
  *G06F 13/10* (2006.01)
  *G06F 15/16* (2006.01)
  *G06F 3/06* (2006.01)

(56) References Cited

U.S. PATENT DOCUMENTS

| | | | |
|---|---|---|---|
| 5,592,657 | A | 1/1997 | Johnson et al. |
| 5,757,371 | A | 5/1998 | Oran et al. |
| 5,828,376 | A | 10/1998 | Solimene et al. |
| 6,043,816 | A | 3/2000 | Williams et al. |
| 6,133,915 | A | 10/2000 | Arcuri et al. |
| 6,167,425 | A | 12/2000 | Beckhoff |
| 6,170,045 | B1 | 1/2001 | Bobak et al. |
| 6,178,503 | B1 | 1/2001 | Madden et al. |
| 6,205,452 | B1 | 3/2001 | Warmus et al. |
| 6,215,490 | B1 | 4/2001 | Kaply |
| 6,336,120 | B1 | 1/2002 | Noddings et al. |
| 6,336,146 | B1 | 1/2002 | Burridge et al. |
| 6,338,149 | B1 | 1/2002 | Ciccone, Jr. et al. |
| 6,460,136 | B1 | 10/2002 | Krohmer et al. |
| 6,571,282 | B1 | 5/2003 | Bowman-Amuah |
| 6,691,146 | B1 | 2/2004 | Armstrong et al. |
| 6,710,788 | B1 | 3/2004 | Freach et al. |
| 6,757,002 | B1 | 6/2004 | Oross et al. |
| 6,763,458 | B1 | 7/2004 | Watanabe et al. |
| 7,114,104 | B1 | 9/2006 | Bennett |
| 7,328,333 | B2 | 2/2008 | Kawano et al. |
| 7,363,128 | B2 | 4/2008 | Dietsch et al. |
| 7,424,601 | B2 | 9/2008 | Xu |
| 7,424,623 | B2 | 9/2008 | Du et al. |
| 7,461,144 | B1 | 12/2008 | Beloussov et al. |
| 7,523,738 | B2 | 4/2009 | Ording et al. |
| 7,529,921 | B2 | 5/2009 | Stein et al. |
| 7,533,101 | B2 | 5/2009 | Bond et al. |
| 7,536,537 | B2 | 5/2009 | Linn |
| 7,590,945 | B2 | 9/2009 | Sims et al. |
| 7,595,810 | B2 | 9/2009 | Louch |
| 7,634,770 | B2 | 12/2009 | Roth |
| 7,636,586 | B2 | 12/2009 | Maaniitty |
| 7,681,134 | B1 * | 3/2010 | Grechishkin et al. ......... 715/740 |
| 7,689,820 | B2 | 3/2010 | Pierce et al. |
| 7,783,665 | B1 | 8/2010 | Tormasov et al. |
| 7,882,274 | B2 | 2/2011 | Peterson |
| 7,975,236 | B1 * | 7/2011 | Grechishkin et al. ......... 715/765 |
| 8,046,570 | B2 | 10/2011 | King et al. |
| 8,177,554 | B2 | 5/2012 | Krasner |
| 8,195,624 | B2 | 6/2012 | Yang |
| 8,261,231 | B1 | 9/2012 | Hirsch et al. |
| 8,307,177 | B2 | 11/2012 | Prahlad et al. |
| 8,352,733 | B2 | 1/2013 | Mantere et al. |
| 8,392,498 | B2 | 3/2013 | Berg et al. |
| 8,396,807 | B1 | 3/2013 | Yemini et al. |
| 8,448,251 | B2 | 5/2013 | Harris et al. |
| 8,589,952 | B2 | 11/2013 | Wong et al. |
| 8,661,360 | B2 | 2/2014 | Jeong et al. |
| 8,868,899 | B2 | 10/2014 | Galicia et al. |
| 8,983,536 | B2 | 3/2015 | Gangam et al. |
| 2001/0035882 | A1 | 11/2001 | Stoakley et al. |
| 2002/0078260 | A1 | 6/2002 | Hart et al. |
| 2002/0140742 | A1 | 10/2002 | Lection et al. |
| 2002/0151334 | A1 | 10/2002 | Sharma |
| 2002/0157001 | A1 | 10/2002 | Huang et al. |
| 2003/0065738 | A1 | 4/2003 | Yang et al. |
| 2003/0135771 | A1 | 7/2003 | Cupps et al. |
| 2003/0204708 | A1 | 10/2003 | Hulme et al. |
| 2003/0221087 | A1 | 11/2003 | Nagasaka |
| 2004/0015966 | A1 | 1/2004 | MacChiano et al. |
| 2004/0039950 | A1 | 2/2004 | Okamoto et al. |
| 2004/0061723 | A1 | 4/2004 | Tai et al. |
| 2004/0066414 | A1 | 4/2004 | Czerwinski et al. |
| 2004/0095388 | A1 | 5/2004 | Rocchetti et al. |
| 2004/0111644 | A1 | 6/2004 | Saunders et al. |
| 2004/0148375 | A1 | 7/2004 | Levett et al. |
| 2004/0205755 | A1 | 10/2004 | Lescouet et al. |
| 2004/0207508 | A1 | 10/2004 | Lin et al. |
| 2005/0086650 | A1 | 4/2005 | Yates et al. |
| 2005/0108297 | A1 | 5/2005 | Rollin et al. |
| 2005/0125739 | A1 | 6/2005 | Thompson et al. |
| 2005/0229188 | A1 | 10/2005 | Schneider |
| 2005/0240756 | A1 | 10/2005 | Mayer |
| 2005/0240763 | A9 | 10/2005 | Bhat et al. |
| 2005/0246505 | A1 | 11/2005 | McKenney et al. |
| 2005/0268078 | A1 | 12/2005 | Zimmer et al. |
| 2006/0005187 | A1 * | 1/2006 | Neil .................................. 718/1 |
| 2006/0010314 | A1 | 1/2006 | Xu |
| 2006/0010446 | A1 | 1/2006 | Desai et al. |
| 2006/0026274 | A1 | 2/2006 | Cho et al. |
| 2006/0046706 | A1 | 3/2006 | Lin et al. |
| 2006/0146057 | A1 | 7/2006 | Blythe |
| 2006/0224989 | A1 | 10/2006 | Pettiross et al. |
| 2006/0225107 | A1 | 10/2006 | Seetharaman et al. |
| 2006/0253706 | A1 | 11/2006 | Roberts et al. |
| 2007/0050765 | A1 | 3/2007 | Geisinger |
| 2007/0128899 | A1 | 6/2007 | Mayer |
| 2007/0135043 | A1 | 6/2007 | Hayes et al. |
| 2007/0150842 | A1 | 6/2007 | Chaudhri et al. |
| 2007/0162298 | A1 | 7/2007 | Melton et al. |
| 2007/0180398 | A1 | 8/2007 | McArdle |
| 2007/0192329 | A1 | 8/2007 | Croft et al. |
| 2007/0198656 | A1 | 8/2007 | Mazzaferri et al. |
| 2007/0226647 | A1 | 9/2007 | Louch |
| 2007/0266231 | A1 | 11/2007 | Chua |
| 2007/0283147 | A1 | 12/2007 | Fried et al. |
| 2007/0288941 | A1 | 12/2007 | Dunshea et al. |
| 2007/0294689 | A1 | 12/2007 | Garney |
| 2008/0028326 | A1 * | 1/2008 | Wilson et al. .................. 715/762 |
| 2008/0034318 | A1 | 2/2008 | Louch et al. |
| 2008/0082815 | A1 | 4/2008 | Kawano et al. |
| 2008/0100568 | A1 | 5/2008 | Koch et al. |
| 2008/0114844 | A1 * | 5/2008 | Sanchez et al. ............... 709/206 |
| 2008/0162983 | A1 | 7/2008 | Baba et al. |
| 2008/0256468 | A1 | 10/2008 | Peters et al. |
| 2008/0270910 | A1 | 10/2008 | Lukasik et al. |
| 2008/0276195 | A1 | 11/2008 | Moromisato et al. |
| 2008/0282205 | A1 | 11/2008 | Dykstra-Erickson et al. |
| 2008/0307350 | A1 | 12/2008 | Sabatelli et al. |
| 2008/0307360 | A1 | 12/2008 | Chaudhri et al. |
| 2009/0031329 | A1 | 1/2009 | Kim |
| 2009/0037909 | A1 | 2/2009 | Xu |
| 2009/0063845 | A1 | 3/2009 | Lin |
| 2009/0064186 | A1 | 3/2009 | Lin |
| 2009/0080562 | A1 | 3/2009 | Franson |
| 2009/0089569 | A1 | 4/2009 | Baribault et al. |
| 2009/0158299 | A1 | 6/2009 | Carter |
| 2009/0193074 | A1 | 7/2009 | Lee |
| 2009/0199122 | A1 | 8/2009 | Deutsch et al. |
| 2009/0199219 | A1 | 8/2009 | Rofougaran et al. |
| 2009/0235200 | A1 | 9/2009 | Deutsch et al. |
| 2009/0241072 | A1 | 9/2009 | Chaudhri et al. |
| 2009/0276771 | A1 | 11/2009 | Nickolov et al. |
| 2009/0287571 | A1 | 11/2009 | Fujioka |
| 2009/0327917 | A1 | 12/2009 | Aaron et al. |
| 2009/0328033 | A1 | 12/2009 | Kohavi et al. |
| 2010/0064251 | A1 | 3/2010 | Hufnagel et al. |
| 2010/0077347 | A1 | 3/2010 | Kirtane et al. |
| 2010/0097386 | A1 | 4/2010 | Kim et al. |
| 2010/0107115 | A1 | 4/2010 | Sareen et al. |
| 2010/0138515 | A1 | 6/2010 | Ruiz-Velasco et al. |
| 2010/0192149 | A1 | 7/2010 | Lathrop et al. |
| 2010/0211769 | A1 | 8/2010 | Shankar et al. |
| 2010/0217912 | A1 | 8/2010 | Rofougaran et al. |
| 2010/0245037 | A1 | 9/2010 | Davis et al. |
| 2010/0313156 | A1 | 12/2010 | Louch et al. |
| 2010/0313165 | A1 | 12/2010 | Louch et al. |
| 2010/0319008 | A1 | 12/2010 | Ho |
| 2010/0333088 | A1 | 12/2010 | Rogel et al. |
| 2010/0333183 | A1 | 12/2010 | Miyazaki et al. |
| 2011/0016299 | A1 * | 1/2011 | Galicia et al. ..................... 713/1 |
| 2011/0016301 | A1 | 1/2011 | Galicia et al. |
| 2011/0022993 | A1 | 1/2011 | Ohno et al. |
| 2011/0054879 | A1 | 3/2011 | Bogsanyl et al. |
| 2011/0055602 | A1 | 3/2011 | Kamay et al. |
| 2011/0066984 | A1 | 3/2011 | Li |
| 2011/0093691 | A1 | 4/2011 | Galicia et al. |

(56) References Cited

U.S. PATENT DOCUMENTS

| | | | |
|---|---|---|---|
| 2011/0093836 | A1 | 4/2011 | Galicia et al. |
| 2011/0119610 | A1 | 5/2011 | Hackborn et al. |
| 2011/0126216 | A1 | 5/2011 | Galicia et al. |
| 2011/0138295 | A1 | 6/2011 | Momchilov et al. |
| 2011/0138314 | A1 | 6/2011 | Mir et al. |
| 2011/0144970 | A1 | 6/2011 | Jiang et al. |
| 2011/0179387 | A1 | 7/2011 | Shaffer et al. |
| 2011/0246786 | A1 | 10/2011 | Laor et al. |
| 2012/0036450 | A1 | 2/2012 | Canton |
| 2012/0041570 | A1 | 2/2012 | Jones et al. |
| 2012/0042159 | A1 | 2/2012 | Liu |
| 2012/0081353 | A1* | 4/2012 | Yusupov et al. ............... 345/418 |
| 2012/0081380 | A1 | 4/2012 | Reeves et al. |
| 2012/0083264 | A1 | 4/2012 | Ramasamy et al. |
| 2012/0084542 | A1 | 4/2012 | Reeves et al. |
| 2012/0084791 | A1 | 4/2012 | Benedek et al. |
| 2012/0102495 | A1 | 4/2012 | Gangam et al. |
| 2012/0150970 | A1 | 6/2012 | Peterson et al. |
| 2012/0151372 | A1 | 6/2012 | Kominac et al. |
| 2012/0173741 | A1 | 7/2012 | Brittain et al. |
| 2012/0173986 | A1 | 7/2012 | Jung |
| 2012/0174021 | A1 | 7/2012 | Dharawat |
| 2012/0192100 | A1 | 7/2012 | Wang et al. |
| 2012/0227058 | A1 | 9/2012 | Hunt et al. |
| 2012/0278747 | A1 | 11/2012 | Abraham et al. |
| 2012/0278750 | A1 | 11/2012 | Abraham et al. |
| 2012/0304092 | A1 | 11/2012 | Jarrett et al. |
| 2013/0160013 | A1 | 6/2013 | Pires et al. |
| 2013/0212283 | A1 | 8/2013 | Wang et al. |
| 2013/0293573 | A1 | 11/2013 | Wolfe et al. |
| 2013/0298140 | A1 | 11/2013 | Wolfe et al. |
| 2013/0298141 | A1 | 11/2013 | Wolfe et al. |

FOREIGN PATENT DOCUMENTS

| | | |
|---|---|---|
| CN | 101149685 A | 3/2008 |
| CN | 101203842 A | 6/2008 |
| CN | 101382833 A | 3/2009 |
| CN | 101615123 A | 12/2009 |
| CN | 101697181 A | 4/2010 |
| EP | 1059582 A2 | 12/2000 |
| EP | 1577783 A1 | 9/2005 |
| EP | 1688816 A1 | 8/2006 |
| GB | 2369959 A | 6/2002 |
| JP | H 07-121336 A | 5/1995 |
| JP | 2005-242445 A | 9/2005 |
| JP | 2007-034600 A | 2/2007 |
| JP | 2009-157802 A | 7/2009 |
| RU | 2005136419 A | 5/2007 |
| RU | 2331160 C2 | 8/2008 |
| WO | WO-03/027876 A1 | 4/2003 |
| WO | WO-2005/043862 A1 | 5/2005 |
| WO | WO-2007/035611 A2 | 3/2007 |
| WO | WO-2010/148306 A1 | 12/2010 |
| WO | WO-2011/060382 A1 | 5/2011 |
| WO | WO-2012/012865 A1 | 2/2012 |
| WO | WO-2012/148881 A1 | 11/2012 |
| WO | WO-2012/148885 A1 | 11/2012 |

OTHER PUBLICATIONS

Patent Cooperation Treaty, "PCT Search Report and Written Opinion of the International Searching Authority" for International Application No. PCT/US2011/067606 Apr. 12, 2012, 13 pages.

Turner, David, "Introducing Android 1.5 NDK, Release 1" Internet Citation, Jun. 25, 2009, pp. 1-3.

Maker, Frank and Chan, Yu-Hsuan, "A Survey on Adroid vs. Linux", University of California, 2009, pp. 1-10.

Parikshit H. Dharawat, et al, "Systems and Methods for Displaying Android Applications Launchers in Webtop Application Tray", Jan. 4, 2011, 33 pages, U.S. Appl. No. 12/984,227.

United States Patent and Trademark Office, "Non-Final Rejection" for U.S. Appl. No. 12/984,227 dated Dec. 26, 2012, 17 pages.

Codecoffee, "How to compile & execute C programs under Linux (Absolute basics)", http://web.archive.org/web/20091025120242/http://www.codecoffee.com/tipsforlinux/articles/18.html dated Oct. 25, 2009, http://www.codecoffee.com/tipsforlinux/articles/18. html.

Wikipedia, "Comparison of X Window System desktop environments", http://web.archive.org/web/200901 071331 09/http://en.wikipedia.org/wiki/Comparison_oCX_Window_System_desktop_environments dated Jan. 7, 2009, http://en.wikipedia.org/wiki/Comparison_oCX_Windo.

Wikipedia, "X Window System", http://web.archive.org/web/200901 07225926/http://en.wi kiped ia.org./wiki/X_window_system dated Jan. 7, 2009, http://en.wikipedia.org./wiki/X_window_system, printout pp. 1-11.

Wikipedia, "GNU C Library", http://web.archive.org/web/20091111 083742/http://en.wikipedia.org/wiki/GNU_C_Library dated Nov. 11, 2009, http://en.wikipedia.org/wiki/GNU_C_Library, printout pp. 1-4.

Wikipedia, "POSIX", http://web.archive.org/web/20090423042132/http://en.wikipedia.org/wiki/POSIX dated Apr. 23, 2009, http://en.wikipedia.org/wiki/POSIX, printout pp. 1-5.

An Overview of Virtulization Techniques, Jun. 4, 2009 www.virtuatopia.com/index.pjp/AnOverview_of_Virtualization_Techniques, 4 pages.

Android Central Forums: Getting Started with Android—Tips and Tricks, http://forums.androidcentral.com/general-help-how/31622-getting-started-android-tips-tricks.html, Sep. 2010, excerpted 41 pages.

The Sun Babelfish Blog, "why Apple Spaces is Broken," Nov. 2007, blogs.oracle.com/bblfish/entry/why_apple_spaces_is_broken, 24 pages.

Baentsch, "Mote Runner: A Mu,ti-Language Virtual Machine for Small Embedded Devices," 2009 3rd International Conference on Sensor Technologies and Applications, IEEE 10 pages.

Casadevall, et al., "Android Execution Environment," retrieved from <https://wiki.ubuntu.com/Specs/AndroidExecutionEnvironment>, Apr. 28, 2009, 5 pages.

Citrix: Go ToAssist Corporate Remote Support Made Easy, www.gotoassist.com, Fact Sheet, 10.8.10/B-27141/PDF, 2010, Citrix Online LLC.

Citrix: Go ToAssist Corporate Remote Support Made Easy, www.gotoassist.com, Product Overview, 4.21.10/B-26651/PDF, 2010, Citrix Online LLC.

Citrix: Go ToAssist Express Remote Support Made Easy, www.gotoassist.com, Fact Sheet, 9.27.10/B-21307/PDF, 2010, Citrix Online LLC.

Dormon: Motorola Atrix Lapdock, http://www.theregister.co.uk/Print/2011/08/19/accessory_of_the_week_motorola_atrix_lapdock, Aug. 2011, 8 pages.

D'SA, "Run Android apps on Windows," Nov. 2011, http://tech2.In.com/how-to/apps/run-android-apps-on-windows/259042.

EGL 1.0 Specification, published Jul. 23, 2003.

Getting Started with VMware Fusion for Mac OS X, VMware, item EN-000189-00, copyright 2007-2009, VMware, Inc.

Hassan, "Ubiquitous Computing and Android" 3rd International Conference Digital Information Management 2008, IEEE 6 pages.

Herrman: VMWare for Mobile Devices Lets yuou Run Windows and Android Simultaneously, http://gizmodo.com/5160685/vmware-for-mobile-devices-lets-you-run-windows-and-android-simultaneously/all, Feb. 2009, 2 pages.

Kobie, "Vmware demos mobile virtualisation," Feb. 2009, http://itpro.co.uk/609992/vmware-demos-mobile-virtualisation KOBIE.

Martin: iTunes 9.0.2 Improves App Sorting, http://reviews.cnet.com/8301-19512_7-10387022-233.html?tag=contentMain;contentBody;1n, Oct. 2009, 5 pages.

Meier "Professional Android 2 Application Development," Aug. 2010, retrieved from http://esys.ir/files/ref_books/android/esys.ir_professional%20android%202%20application%20development.pdf.

Nakajima, et al., "Composition Kernel: A multicore Processor Virtualization Layer for Rich Functional Smart Products," Software Technologies for Embedded and Ubiquitous Systems, Oct. 2010, pp. 227-238NAKAJIMA.

(56) References Cited

OTHER PUBLICATIONS

Parallels: Parallels Workstation, http://www.parallels.com/products/workstation/, downloaded Dec. 28, 2012.

Paul, "Canonical developers aim to make Android apps run on Ubuntu," May 2009, Ars Technica, downloaded from http://arstechnica.com/gadgets/2009/05/canonical-developers-aim-to-make-android-apps-run-on-ubuntu, 3 pages.

Payne, et al. "Lares: An Architecture for Secure Active Monitoring Using Virtualization," IEEE Symposium on Security and Privacy, May 2008, pp. 233-247.

Payne, et al. "Secure and Flexible Monitoring of Virtual Machines," Computer Security Applications Conference, Dec. 2007, pp. 385-397.

Ramananthan: Ubuntu For Android: The Complete Story, http://www.muktware.com/2012/02/ubuntu-for-andriod-the-complete-story/2553, Feb. 2012, 5 pages.

Richardson, et al., "Virtual Network Computing," IEEE Internet Computing, IEEE Service Center, Jan. 1998, vol. 2, No. 1, pp. 33-38.

The Xen Team: "Users' manual Xen v 2.0 for x86" University of Cambridge, UK Dec. 31, 2004 56 pages.

Tubbs, "Windows Live Mesh 2011 and SkyDrive Synced Storage woven together nicely; still a few loose threads," posted Oct. 29, 2010, http://www.wysiwygmedia.com/reviews/windows-live-mesh-2011-and-skydrive-synced-storage-woven-together-nicely-still-a-few-loose-threads.wm.

Ubuntu from Wikipedia http://en.wikipedia.org/wiki/ubuntu; 12 pages, printed Jun. 5, 2009.

"Ubuntu Linux Rocks!!" published Nov. 15, 2009, http://maxtheitpro.com/ubuntu-linux-rocks.

Ubuntu Mobile from Wikipedia http://en.wikipedia.org/wiki/ubuntu_mobile; 2 pages, printed Jun. 5, 2009.

Vmware: VMware Workstation 7 Product FAQs, downloaded Apr. 18, 2011.

VMware Workstation 7, The Gold Standard in Desktop Virtualization, Product Datasheet, 2009, www.vmware.com.

Whitwam: Everything You Need to Know about Ubunto for Android; http://www.tested.com/tech/android/3627-everything-you-need-to-know-about-ubuntu-for-android/, Feb. 2012, 5 pages.

Wikipedia "Taskbar" retrieved from http://en.wikipedia.org/wiki/Taskbar dated Feb. 24, 2010; 7 pages.

Windows Live Mesh, Windows Live, 2011, Microsoft.

Gelchlik, "How To Lock Your Computer with Bluetooth Proximity Lock Utility," Apr. 27, 2010, http://www.makeuseof.com/tag/lock-windows-computer-bluetooth-proximity-lock-utility/.

Mac OS X Hints, "Lock and unlock a Mac using Bluetooth detection," Dec. 29, 2009, http://hints.macworld.com/article.php?story=20091221173111783.

Ubuntu forums, "Howto: Use BlueProximity and your cellphone for security," Feb. 20, 2008, http://ubuntuforums.org/showthread.php?t=702372.

Webtop Application, archived Apr. 29, 2011, 6 pages, retrieved from https://web.archive.org/web/20110429011220/http://www.motorola.com/support/us-en/consumer-support/software/webtop_application.

\* cited by examiner

SYNCHRONIZING LAUNCH-CONFIGURATION INFORMATION BETWEEN FIRST AND SECOND APPLICATION ENVIRONMENTS THAT ARE OPERABLE ON A MULTI-MODAL DEVICE

BACKGROUND

Particular embodiments generally relate to managing applications that operate on a multi-modal device.

Multi-modal devices, such as mobile communication devices, personal digital assistants (PDAs), etc., have relatively powerful computing capability for operating a variety of launchable objects, such as applications, bookmarks, etc. Further, multi-modal devices also have relatively large memories that can store a relatively large number of launchable objects. With the current number of launchable objects that a multi-modal device can store and operate, managing the launchable objects has become a burden for users.

Managing launchable objects on a multi-modal device may include loading the launchable objects onto the multi-modal device, loading updates for the launchable objects, creating favorites lists for the launchable objects, moving launcher object (e.g., icons for launching launchable objects) for launchable objects to selected panels, a docking bar, etc. Multi-modal devices provide tools for managing launchable objects. However, the tools provided by a multi-modal device for managing a launchable object typically require that a user provide numerous inputs to the multi-modal device to manage the launchable object. For example, a user interacting with a touch screen of a multi-modal device may be required to make several gestures (e.g., taps, swipes, etc.) on the touch screen to locate a launcher object for a launchable object and select the launcher object for launching the launchable object. For example, several panels on a multi-modal device may need to be traversed to locate a launcher object, or several menus and sub-menus may need to be traversed to locate the launcher object. Some docking systems for docking a multi-modal device to a hardware module provide for some simplification in managing launchable objects. However, these docking systems still require some user management of the launchable objects to achieve a simplified user interface on the hardware module.

DETAILED DESCRIPTION

Described herein are techniques for managing launchable objects, such as applications, bookmarks, etc., on multi-modal devices. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

According to one embodiment, a method operable on a multi-modal device for transferring launch-configuration information for a set of panels and a first docking bar in a first application environment to a second application environment for a second docking bar in the second application environment includes detecting a docking of the multi-modal device to a hardware module, and displaying, in response to the docking, a user interface for the second application environment operating on the multi-modal device on the hardware module. The method further includes receiving, in response to the docking, at the second application environment the launch-configuration information for launching launchable objects in the first application environment from the second application environment on the multi-modal device. The method further includes parsing, by the second application environment, the launch-configuration information to determine a change to the set of panels or the first docking bar, wherein the change is in the first application environment; and changing the second docking bar to include the change to the set of panels or the first docking bar based on parsing the launch-configuration information.

According to another embodiment, a non-transitory computer-readable storage medium includes instructions for transferring launch-configuration information for a set of panels and a first docking bar in a first application environment to a second application environment for a second docking bar in the second application environment. The instructions are for controlling a multi-modal device to be operable for: detecting a docking of the multi-modal device to a hardware module; displaying, in response to the docking, a user interface for the second application environment operating on the multi-modal device on the hardware module; receiving, in response to the docking, at the second application environment the launch-configuration information for launching launchable objects in the first application environment from the second application environment on the multi-modal device; parsing, by the second application environment, the launch-configuration information to determine a change to the set of panels or the first docking bar, wherein the change is in the first application environment; and changing the second docking bar to include the change to the set of panels or the first docking bar based on parsing the launch-configuration information.

According to another embodiment, a multi-modal device configured for transferring launch-configuration information for a set of panels and a first docking bar in a first application environment to a second application environment for a second docking bar in the second application environment, the multi-modal device includes a processor for operating the first application environment and the second application environment; and a computer-readable storage medium comprises instructions for controlling the processors to be operable for: detecting a docking of the multi-modal device to a hardware module; displaying, in response to the docking, a user interface for the second application environment operating on the multi-modal device on the hardware module; receiving, in response to the docking, at the second application environment the launch-configuration information for launching launchable objects in the first application environment from the second application environment on the multi-modal device; parsing, by the second application environment, the launch-configuration information to determine a change to the set of panels or the first docking bar, wherein the change is in the first application environment; and changing the second docking bar to include the change to the set of panels or the first docking bar based on parsing the launch-configuration information.

Figure 1:
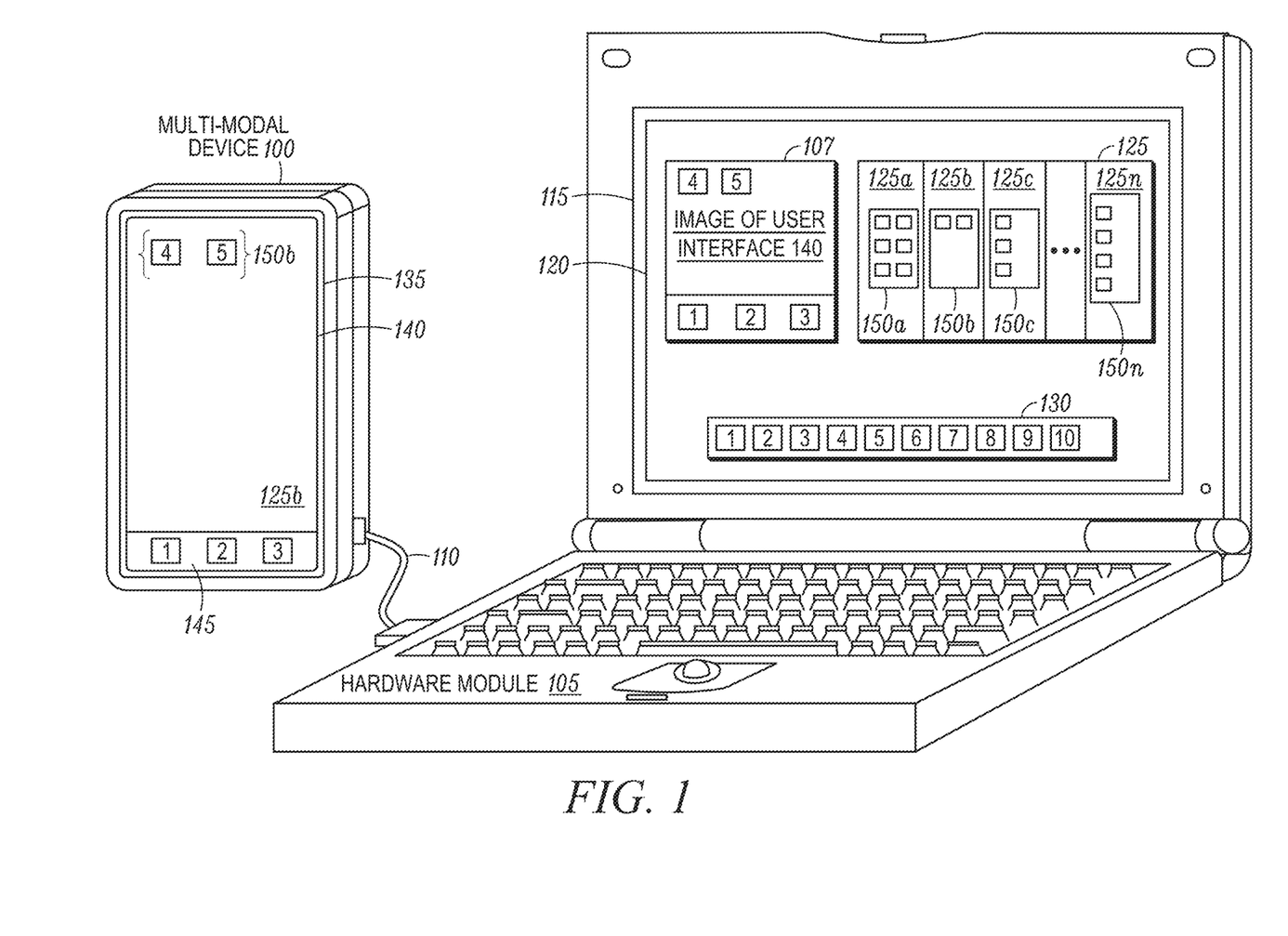
FIG. 1 depicts an example of a multi-modal device coupled to a hardware module via a dock.

FIG. 1 depicts an example of a multi-modal device 100 coupled to a hardware module 105 via a dock 110. Multi-modal device 100 may be a mobile telephone (such as a smartphone), a personal digital assistant (PDA), etc. Hardware module 105 may be a monitor, such as a television or a stand-alone monitor configured to be used with a computing device. According to an embodiment where hardware module 105 is a monitor, the monitor may be a "dumb" monitor having little or no computer operating capabilities. According to some embodiments, the monitor may have a touch interface.

According to an alternative embodiment, hardware module 105 may be a computing device, such as a personal computer, a laptop computer, a tablet computer, a server computer operating a server operating system, or the like. According to an embodiment where hardware module 105 is a computing device, the computing device may include an integrated monitor (e.g., a laptop computer, tablet computer, etc.) or a stand-alone monitor, which operates in conjunction with the computing device (e.g., desktop computing device with stand-alone monitor). In FIG. 1, hardware module 105 is depicted as a laptop computer.

Hardware module 105 includes a display 115 that displays a user interface 120. User interface 120 may display a set of panels 125 (labeled 125*a*, 125*b* . . . 125*n* in FIG. 1) and a docking bar 130 according to one embodiment. The user interface may provide a screen option for displaying the set of panels 125 and docking bar 130 subsequent to multi-modal device 100 being docked to hardware module 105. Alternatively, the user interface may display the set of panels 125 and docking bar 130 subsequent to multi-modal device 100 being docked to hardware module 105 by default. The default may be a user-selectable options.

Multi-modal device 100 includes a display 135 that displays a user interface 140. User interface 140 may display a selected panel (e.g., panel 125*b*) from the set of panels 125. The displayed panel on user interface 140 is sometimes referred to as a home-screen panel. The home-screen panel displayed on user interface 140 may be changed by dragging the displayed home-screen panels with a finger swipe or the like until different home-screen panel is displayed. User interface 140 may also display a docking bar 145.

One or more panels in the set of panels 125 may be associated with a set of launcher objects. The sets of launcher objects are labeled 150*a*, 150*b* . . . 150*n* in FIG. 1 and are respectively associated with panels 125*a*, 125*b* . . . 125*n*. While, each panel in the set of panels 125 is described as being associated with a set of launcher objects, one or more of the panels might not be associated with a set of launcher objects. The panels not associated with a set of launcher objects may be associated with other objects, such as widgets, files, etc. (described in further detail below). If a selected panel from the set of panels 125 is displayed on user interface 140, the set of launcher objects associated with the selected panel is displayed in the selected panel of user interface 140. For example, the set of launcher objects 150*b* that is associated with panel 125*b* is shown in panel 125*b* in FIG. 1.

A bookmark may be link. For example, a bookmark may be a link to a website, or the like. A widget includes a graphic on a panel and may provide status information (e.g., clock, calendar, weather, etc.), may provide an option to change a setting (turn Wi-Fi on/off, turn airplane mode on/off, etc.), may add a function to a panel, etc. A folder may be a folder for applications, bookmarks, other folders, etc.

Launcher objects may include icons for launchable objects, such as applications, bookmarks, etc., where an icon may include graphics and/or text, which identify a launchable object associated with the launcher object. A launcher object may be associated with a launchable object identified by the launcher object. For example, a launcher object that includes an application icon may be associated with an application represented by the application icon. According to another example, a launcher object for a bookmark may be associated with the link represented by the bookmark. As is well known in the art, if a launcher object is selected, the launcher object initiates the launch of the launchable object associated with the launcher object. For example, if the launcher object is for an application, selection of the launcher object may initiate the launching of the application.

As described briefly above, user interface 120 may display the set of panels 125 and docking bar 130 if multi-modal device 100 is docked to hardware module 105. According to a further embodiment, if multi-modal device 100 is docked to hardware module 105, manipulation of one or more of panels 125 on one of multi-modal device 100 and hardware module 105, causes the same manipulation to be displayed and on the other of multi-modal device 100 and hardware module 105. For example, if panel 125*b* (shown as the home screen panel in FIG. 1) is manipulated (e.g., added, removed, changed, resized, etc.) on multi-model device 100, the same manipulation is displayed on panel 125*b* on hardware module 105 according to one embodiment. The change to panel 125*b* may also be displayed on an image 107 of user interface 140 displayed on hardware module 105. According to specific example, if a launcher object is added to panel 125*b* on multi-modal device 100, the launcher object is added to panel 125*b* on hardware module 105 and may be added to image 107 of user interface 140 on hardware module 105.

According to another example, if panel 125*b* is manipulated (e.g., added, removed, changed, resized, etc.) on hardware module 105, the same manipulation is displayed on panel 125*b* on multi-modal device 100. According to a specific example, if a launcher object is added to panel 125*b* on hardware module 105, the launcher object is added to panel 125*b* on multi-modal device 100.

According to one embodiment, a manipulation of a launcher object in one or more of panels 125 on multi-modal device 100 causes a corresponding manipulation of the launcher object in docking bar 130 on hardware module 105. For example, if a launcher object is added to a panel included in the set of panels 125 on multi-modal device 100, the launcher object is added to docking bar 130. Alternatively, if a launcher object is removed from a panel included in the set of panels 125 on multi-modal device 100, the launcher object is removed from docking bar 130. Similarly, if a launcher object is modified (e.g., resized, updated to include different graphics or text, etc.) in a panel included in the set of panels 125 on multi-modal device 100, the launcher object is similarly modified in docking bar 130.

According to a further embodiment, a manipulation of a launcher object in docking bar 145 on multi-modal device 100 causes a corresponding manipulation of the launcher object in docking bar 130 on hardware module 105. For example, if a launcher object is added to docking bar 145 on multi-modal device 100, the launcher object is added to docking bar 130. Alternatively, if a launcher object is removed from docking bar 145 on multi-modal device 100, the launcher object is removed from docking bar 130. Similarly, if a launcher object is modified (e.g., resized, updated to include different graphics or text, etc.) in docking bar 145, the launcher object is similarly modified in docking bar 130.

According to one embodiment, docking bar 130 may be modified to include all of the launcher objects on all panels in the set of panels 125 and to include all of the launcher objects in docking bar 145. FIG. 1 depicts docking bar 130 displaying launcher objects 1-10, where launcher objects 1-3 are displayed on docking bar 145, launcher objects 4-5 are displayed on a home-screen panel (a panel included in the set of panels 125 and displayed on user interface 140), and launcher objects 6-7 are associated with one or more panels in the set of panels 125 where the one or more panels may not be displayed on user interface 140. Launcher objects 8-10 may not be associated with the set of panels 125 or docking bar 145. Launcher objects 8-10 are described in further detail below. The selection of a selected launcher object (e.g., cursor control via a mouse, touch, etc.) on docking bar 130 may launch a selected launchable object associated with the selected launcher object. The selected launchable object may be launched on multi-modal device 100. The launcher objects displayed on docking bar 130 are described in further detail below.

Figure 2:
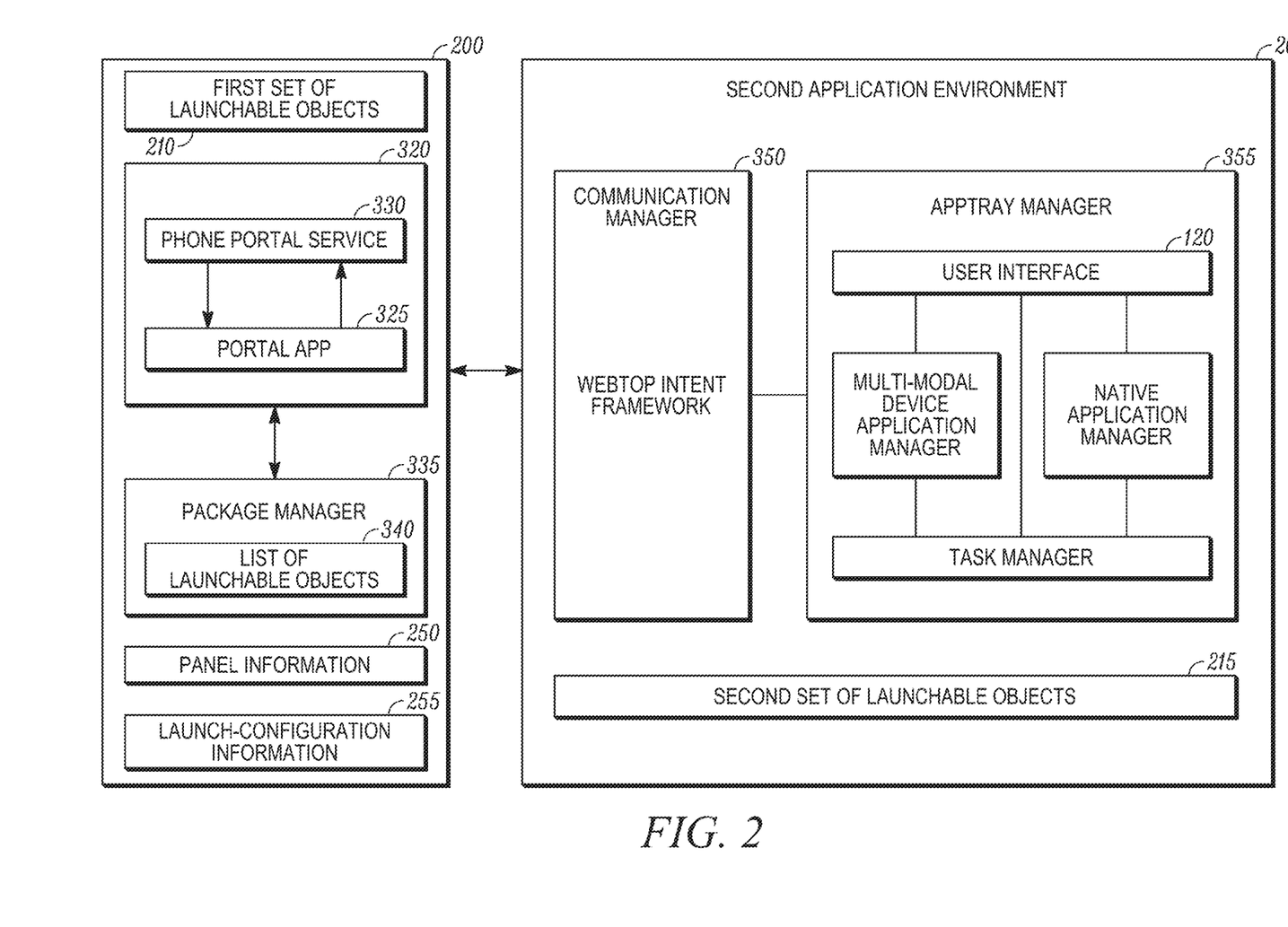
FIG. 2 depicts a software environment of the multi-modal device according to one embodiment.

FIG. 2 depicts a software environment of multi-modal device 100 according to one embodiment. Multi-modal device 100 is configured to operate a first application environment 200 and a second application environment 205 according to one embodiment. An application environment may include frameworks, libraries, and services for supporting launchable objects (e.g., applications, bookmarks, etc.) that operate in the application environment. An application environment may also provide a set of application program interfaces (APIs) used for runtime execution of launchable object developed with the APIs. An application environment may also provide a set of panels (e.g., set of panels 125) via which launchable objects may be accessed for use. An application environment may also provide a docking bar (e.g., docking bar 130 or docking bar 140) via which launchable objects may be accessed for use. Different application environments may provide different sets of panels, frameworks, libraries, and services for supporting launchable objects.

First application environment 200 may be a "native" environment of multi-modal device 100, such as a mobile-telephone environment, a PDA environment, or the like. First application environment 200 may operate on multi-modal device 100. First application environment 200 may present user interface 140 on display 135 and may present a selected panel from the set of panels 125 on user interface 140. First application environment 200 may also present docking bar 145 on user interface 140.

Second application environment 205 may be an operating system environment, such as a Linux operating system environment. Second application environment 205 may operate on multi-modal device 100. Second application environment 205 may present user interface 120 on display 115 of hardware module 105 if multi-modal device 100 is docket to hardware module 105. Specifically, second application environment 205 may display image 107 of user interface 120 if multi-modal device 100 is docked to hardware module 105. Second application environment 205 may also displays the set of panels 125 on user interface 120 if multi-modal device 100 is docked to hardware module 105. Second application environment 205 may also display docking bar 130 on user interface 120 if multi-modal device 100 is docked to hardware module 105. Second application environment 205 may not display image 107, the set of panels 125, and docking bar 130 on either of multi-modal device 100 or hardware module 105 if multi-mode device 100 is not docked to hardware module 105.

First application environment 200 may operate a first set of launchable objects 210, and second application environment 205 may operate a second set of launchable objects 215. The first set of launchable objects 210 may be respectively associated with the sets of launcher objects 150a, 150b . . . 150n. The second set of launchable objects 215 may be associated with launcher objects that may be displayed in user interface 120, such as launcher objects 8-10. The sets of launcher objects 150a, 150b . . . 150n displayed by first application environment 200 on user interface 140 may respectively launch the first set of launchable objects 210 in first application environment 200.

The sets of launcher objects 150a, 150b . . . 150n may also be displayed by second application environment 205 on user interface 120 and may launch the first set of launchable objects 210 in first application environment 200. That is, launchable objects operable in the first application environment 200 may be launched via launcher objects from the second application environment 205. Second application environment 205 may collect launch-configuration information 255 from first application environment 200 for the first set of launchable objects 210 so that the first set of launchable objects 210 may be launched from the second application environment. Collection of launch-configuration information 255 by second application environment 205 from first application environment 200 is described in further detail below.

The second set of launchable objects 215 operable in the second application environment 205 on multi-modal device 100 may be launched via launcher objects (e.g., launcher objects 8-10) from the second application environment. It is noted that the first and second sets of launchable objects 215 and 220 may operate on multi-modal device 100 and may not operate on hardware module 105.

As briefly described above, the sets of launcher objects 150a, 150b . . . 150n may be displayed by second application environment 205 on user interface 120. For example, the sets of launcher objects 150a, 150b . . . 150n may be displayed in a launcher-object window on user interface 120 via use selection of a menu option or the like. A launcher-object window may be a distinct window not shown in user interface 120 in FIG. 1 and may display all of the launcher objects from first application environment 200. Launchable objects may be launched from the displayed launcher objects in the launcher-object window by second application environment 205. Selected launcher objects (e.g., launcher objects 1-7) included in the sets of launcher objects 150a, 150b . . . 150n may be displayed on docking bar 130 as described above and as shown in FIG. 1. According to one embodiment, launcher objects may be moved from the launcher-object window to docking bar 130 via user selection. According to another embodiment, second application environment 205 may determine the particular launcher objects (e.g., launchable objects 1-7) displayed in the set of panels 125 and in docking bar 130 in first application environment 200 and may display these launcher objects on docking bar 130. Second application environment 205 may display the particular launcher objects (e.g., launchable objects 1-7) on docking bar 130 without user input.

Second application environment 205 may register to receive communications issued by first application environment 200, and thereafter listen for communications issued by first application environment 200 where the communications indicate one or more changes to one or more panels in the set of panels 125 and one or more changes to docking bar 145. A communication issued by first application environment 200 may include panel information 250 for changes to a panel. A communication issued by first application environment 200 may also include launch-configuration information 255 for the sets of launcher objects 150a, 150b . . . 150n where launch-configuration information 255 include various information for launching launchable objects operable in first application environment 200. Launch-configuration information 255 may be used by both first and second application environments 200 and 205 for launching launchable objects in first application environment 200. Communications exchanged by first and second application environments 200 and 205 are described in further detail below.

Figure 3:
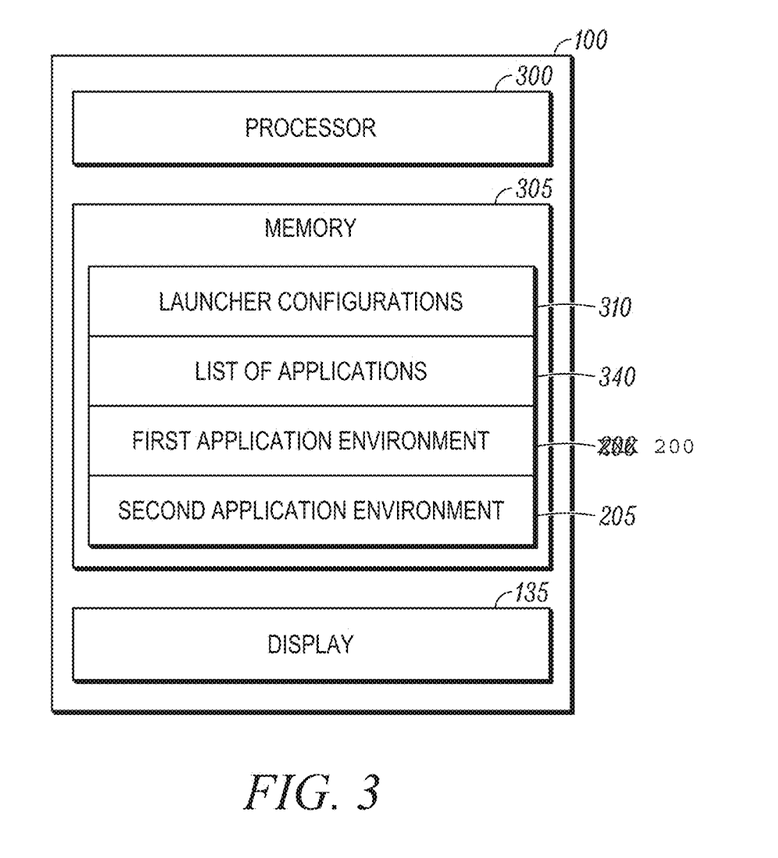
FIG. 3 depicts a system diagram of the multi-modal device according to one embodiment.

FIG. 3 depicts a system diagram of multi-modal device 100 according to one embodiment. Multi-modal device 100 may include a processor 300, a computer readable storage medium (e.g., a non-transitory computer readable storage medium) 305, and display 135. For convenience, computer readable storage medium 305 is referred to as "memory" 305. Memory 305 may include instructions (e.g., computer code) for controlling processor 300 to be operable to execute the various method embodiments described herein. The instructions stored in memory 305 may embody the various method embodiments described herein. According to one embodiment, multi-modal device 100 is configured to store panel information 250 and launch-configuration information 255 in memory 305. While panel information 250 and launch-configuration information 255 are described generally as separate information, launch-configuration information 255 may include panel information 250.

Figure 4:
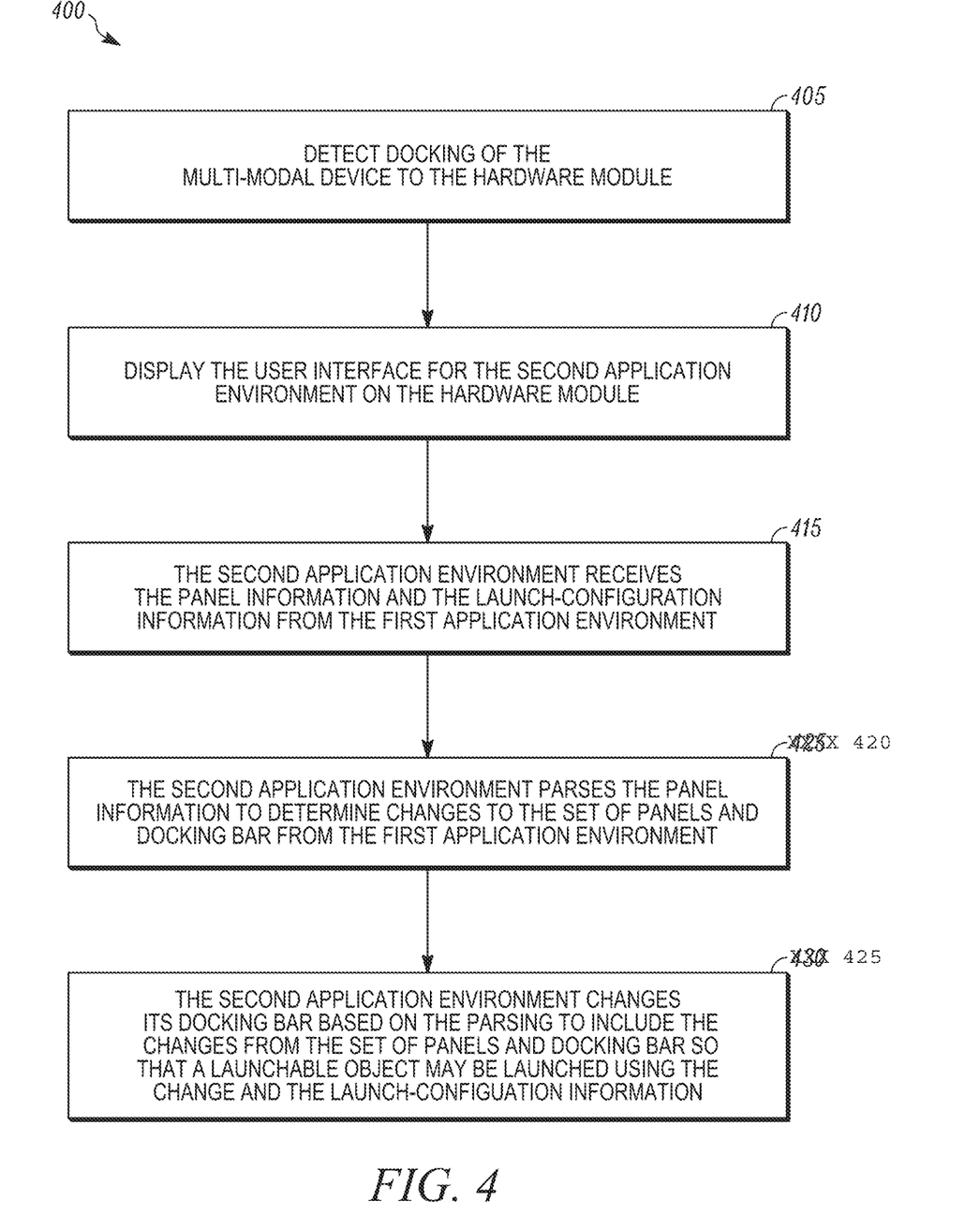
FIG. 4 depicts a high-level flow diagram of a method for transferring panel information and launch-configuration information from a first application environment to a second application environment so that a docking bar in the second application environment may display launcher objects from a set of panels and a docking bar in the first application environment without user input for manually moving the launcher objects to the docking bar in the second application environment.

Transferring Launch-Configuration Information and Panel Information from the First Application Environment to the Second Application Environment FIG. 4 depicts a high-level flow diagram 400 of a method for transferring panel information 250 and launch-configuration information 255 from first application environment 200 to second application environment 205 so that docking bar 130 may display launcher objects from the set of panels 125 and docking bar 145 without user input for manually moving the launcher objects to docking bar 130. The high-level flowchart represents an example embodiment, and those of skill in the art will understand that various steps shown in the simplified flow chart may be added and/or combined without deviating from the purview of the described embodiment.

At 405, multi-modal device 100 detects being docked to hardware module 105. Multi-modal device 100 may be docked to hardware module 105 by a variety of docking technologies and docking protocols.

At 410, user interface 120 may be displayed on display 115 of hardware module 105 where user interface 120 is displayed by second application environment 205, which operates on multi-modal device 100. User interface 120 may display the set of panels 125, docking bar 130, and/or image 107 of user interface 140 on hardware module 105 in response the docking or in response to a user selection received via user interface 120.

At 415, second application environment 205 receives panel information 250 for the set of panels 125 from first application environment 200 and receives launch-configuration information 255 for the set of launchable objects 210 according to one embodiment. Panel information 250 may be generated at first application environment 200 based on user input receive via user interface 140 for changes to one or more panels and may be unsynchronized with second application environment 205. A panel may be changed by adding a launcher object to the panel, removing a launcher object from the panel, altering an appearance of an already displayed launcher object on the panel, resizing a launcher object on the panel (e.g., making the launcher object larger or smaller), adding the panel to the set of panels 125, removing the panel form the set of panels 125, rearranging the panel with respect to other panels in the set of panels 125, etc. Panel information 250 may indicate that a launcher object has been changed as described above or that one or more panels in the set of panels 125 have been change as described above.

Second application environment 205 may also store panel information 250 in memory 305 where second application environment 205 may access panel information 250 for displaying launcher objects in user interface 120. The storage of panel information 250 in memory 305 by second application environment 205 is sometimes referred to as storing panel information 250 in the second application environment.

Second application environment 205 may also store launch-configuration information 255 in memory 305 where second application environment 205 may access launch-configuration information 255 for launching launchable objects in first application environment 200. The storage of launch-configuration information 255 in memory 305 by second application environment 205 is sometimes referred to as storing launch-configuration information 255 in the second application environment. With launch-configuration information 255 for the set of launchable objects 215 stored in second application environment 205, second application environment 205 may launch a selected launchable object, for example, via user selection of a selected launcher object for the selected launchable object. A piece of launch-configuration information for each launcher object may be associated a piece of panel information for each launcher object so that selection of a selected launcher object will cause second application environment 205 to launch a selected launchable object associated with the selected launcher object.

At 420, second application environment 205 may parse panel information 250 to determine a change to the set of panels 125 where the change occurred in first application environment 200.

At 425, at least one launcher object is changed on docking bar 130. The change may be made based on parsing panel information 250 at 420 to determine the change in panel information 250 generated by first application environment 200 at 415. The at least one launcher object may be changed on docking bar 130 by: i) adding the at least one launcher object on docking bar 130, ii) removing the at least one launcher object from docking bar 130, iii) altering (e.g., changing a graphic and/or text) the at least one launcher object on docking bar 130, iv) resizing the at least one launcher object from docking bar 130, or the like. At 425, the at least one launcher object is changed on docking bar 130 if the at least one launcher object is correspondingly changed in the set of panels 125 in first application environment 200 or is correspondingly changed in docking bar 145 in first application environment 200. For example, the at least one launcher object may be added to docking bar 130 if the at least one launcher object is added to the set of panels 125 in first application environment 200 or is added to docking bar 145 in first application environment 200. Alternatively, the at least one launcher object may be removed from docking bar 130 if the at least one launcher object is removed from the set of panels 125 in first application environment 200 or is removed from docking bar 145 in first application environment 200. Alternatively, the at least one launcher object may be altered or resized in docking bar 130 if the at least one launcher object is altered or resized in the set of panels 125 in first application environment 200 or is altered or resized in docking bar 145 in first application environment 200. Panel information 250 transferred from the first application environment to the second application environment may indicate the foregoing described changes.

According to one embodiment, one or more of the foregoing described steps are repeated so that new launcher objects added to the set of panels 125 and/or added to docking bar 145 in first application environment 200, are added to docking bar 130 in second application environment 205. That is, second application environment 205 may continue to listen for new communication issued by first application environment 200 after previous communications are issued by the first application environment to the second application environment. Communication between first and second application environments 200 and 205 might cease if multi-modal device 100 is disconnected from hardware device 105.

The launcher objects that a user places on the set of panels 125 and/or docking bar 145 in first application environment 200, may be generally considered a user's "favorite" launcher objects for a user's "favorite" launchable objects. Displaying the launcher objects from the set of panels 125 and/or docking bar 145 from first application environment 200 in second application environment 205 provides that the user's selection of "favorite" launchable objects are represented on docking bar 130 in second application environment 205 for relatively simplified launch. Recall that at 415 and 420 second application environment 205 receives and stores launch-configuration information 255 for launching the launchable objects, which includes the user's favorite launchable objects represented on docking bar 130. Further, because panel information 250 identifies the user's favorite launchable objects to second application environment 205, the user does not have to go through a manual process of placing favorite launcher objects for the user's favorite launchable objects on docking bar 130.

According to one further embodiment, at least one panel in the set of panels 125 is changed on user interface 120 after panel information 250 and launch-configuration information 255 are transferred to second application environment 205 from first application environment 200. The change is made based on parsing panel information 250 at 420 to determine the change in panel information 250 generated by first application environment 200 at 415. According to one embodiment, the change to the at least one panel on user interface 120 includes a change to a launcher object (e.g., add, remove, alter, resize, etc.) in the at least one panel. According to an alternative embodiment, the at least one panel is changed on user interface 120 by removing the at least one panel for the set of panels 125, adding the at least one panel to the set of panels 125, or rearranging the at least one panel with another panel in the set of panels 125.

Referring again to FIG. 2, first application environment 200 may include a portal service manager 320, which may include a portal application 325 and a portal service 330. First application environment 200 may also include a package manager 335. According to one embodiment, package manager 335 stores and manages a list of launchable objects 340 for launchable objects that operate in the first application environment. Package manager 335 may also store and manage launch-configuration information 255.

Second application environment 205 may include a communication manager 350, which may be the Webtop Intent Framework communication manager of Motorola. Second application environment 205 may also include an application tray manger 355 that manages user interface 120. According to one embodiment, when multi-modal device 100 is docked to hardware module 105, communication manager 350 registers with portal service manger 320 to receive communications form portal service manager 320. Subsequent to communication manager 350 registering with portal service manger 320 to receive communications, communication manager 350 listens for communications from portal service manager 320s where the communications may include panel information 250 for changes to the set of panels 125 and may include launch-configuration information 255 for the sets of launchable objects 150a, 150b . . . 150n. The registration for receiving communications may be viewed as a request for panel information 250 and launch-configuration information 255.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations, and equivalents may be employed without departing from the scope of the invention as defined by the claims.

What is claimed is:

1. A method operable on a multi-modal device for transferring launch-configuration information for a set of panels and a first docking bar in a first application environment to a second application environment for a second docking bar in the second application environment, the method comprising:

detecting a docking of the multi-modal device to a hardware module;

displaying, in response to the docking, a user interface for the second application environment operating on the multi-modal device on the hardware module;

receiving, in response to the docking, at the second application environment the launch-configuration information for launching launchable objects in the first application environment from the second application environment on the multi-modal device;

parsing, by the second application environment operating on the multi-modal device docked to the hardware module, the launch-configuration information to determine a change to the set of panels or the first docking bar, wherein the change is in the first application environment operating on the hardware module;

changing the second docking bar to include the change to the set of panels or the first docking bar based on parsing the launch-configuration information;

sending, by the second application environment, a request for the launch-configuration information to the first application environment, wherein the launch-configuration information is received in response to the request; and subsequent to receiving the launch-configuration information at the second application environment, listening, by the second application environment, for an issued communication from the first application environment for new launch-configuration information that is not synchronized between the first and the second application environments.

2. The method of claim 1, wherein changing the second docking bar includes changing a launcher object to include the change to the set of panels or the first docking bar, and the launcher object on the second docking bar is for launching a launchable object in the first application environment from the second application environment.

3. The method of claim 2, further comprising storing the launch-configuration information by the second application environment on the multi-modal device for launching the launchable object, wherein the launchable object is launched if the launcher object is selected from the second docking bar in the second application environment.

4. The method of claim 2, wherein changing the second docking bar includes removing the launcher object from the second docking bar if the launcher object is removed from the set of panels or the first docking bar, or adding the launcher object to second docking bar if the launcher object is added to the set of panels or the first docking bar.

5. The method of claim 2, wherein changing the second docking bar includes resizing the launcher object in the second docking bar if the launcher object is resized in the set of panels or the first docking bar.

6. The method of claim 2, wherein changing the second docking bar includes updating the launcher object in the second docking bar if the launcher object is updated in the set of panels or the first docking bar.

7. The method of claim 6, wherein updating includes changing graphics or text on the launcher object.

8. The method of claim 2, wherein the launch-configuration information includes panel information for changes to the launcher object.

9. A non-transitory computer-readable storage medium comprising instructions for transferring launch-configuration information for a set of panels and a first docking bar in a first application environment to a second application environment for a second docking bar in the second application environment, the instructions for configuring a multi-modal device to be operable to:
detect a docking of the multi-modal device to a hardware module;
display, in response to the docking, a user interface for the second application environment operating on the multi-modal device on the hardware module;
receive, in response to the docking, at the second application environment the launch-configuration information for launching launchable objects in the first application environment from the second application environment on the multi-modal device;
parse, by the second application environment operating on the multi-modal device docked to the hardware module, the launch-configuration information to determine a change to the set of panels or the first docking bar, wherein the change is in the first application environment operating on the hardware module;
change the second docking bar to include the change to the set of panels or the first docking bar based on parsing the launch-configuration information;
send, by the second application environment, a request for the launch-configuration information to the first application environment, wherein the launch-configuration information is received in response to the request; and
subsequent to receiving the launch-configuration information at the second application environment, listen, by the second application environment, for an issued communication from the first application environment for new launch-configuration information that is not synchronized between the first and the second application environments.

10. The non-transitory computer-readable storage medium of claim 9, wherein changing the second docking bar includes changing a launcher object to include the change to the set of panels or the first docking bar, and the launcher object on the second docking bar is for launching a launchable object in the first application environment from the second application environment.

11. The non-transitory computer-readable storage medium of claim 10, wherein the instructions are for further controlling a multi-modal device to be operable for storing the launch-configuration information by the second application environment on the multi-modal device for launching the launchable object, wherein the launchable object is launched if the launcher object is selected from the second docking bar in the second application environment.

12. The non-transitory computer-readable storage medium of claim 10, wherein the instruction for changing the second docking bar includes instructions for removing the launcher object from the second docking bar if the launcher object is removed from the set of panels or the first docking bar, or adding the launcher object to the second docking bar if the launcher object is added to the set of panels or the first docking bar.

13. The non-transitory computer-readable storage medium of claim 10, wherein the instructions for changing the second docking bar includes instructions for resizing the launcher object in the second docking bar if the launcher object is resized in the set of panels or the first docking bar.

14. The non-transitory computer-readable storage medium of claim 10, wherein the instructions for changing the second docking bar includes instructions for updating the launcher object in the second docking bar if the launcher object is updated in the set of panels or the first docking bar.

15. The non-transitory computer-readable storage medium of claim 14, wherein the instruction for updating includes instruction changing graphics or text on the launcher object.

16. The non-transitory computer-readable storage medium of claim 10, wherein the launch-configuration information includes panel information for change to the launcher object.

17. A multi-modal device configured for transferring launch-configuration information for a set of panels and a first docking bar in a first application environment to a second application environment for a second docking bar in the second application environment, the multi-modal device comprising:
a processor for operating the first application environment and the second application environment; and
a computer-readable storage medium comprises instructions for configuring the processors to be operable to:
detect a docking of the multi-modal device to a hardware module;
display, in response to the docking, a user interface for the second application environment operating on the multi-modal device on the hardware module;
receive, in response to the docking, at the second application environment the launch-configuration information for launching launchable objects in the first application environment from the second application environment on the multi-modal device;
parse, by the second application environment operating on the multi-modal device docked to the hardware module, the launch-configuration information to determine a change to the set of panels or the first docking bar, wherein the change is in the first application environment operating on the hardware module;

change the second docking bar to include the change to the set of panels or the first docking bar based on parsing the launch-configuration information;

send, by the second application environment, a request for the launch-configuration information to the first application environment, wherein the launch-configuration information is received in response to the request; and subsequent to receiving the launch-configuration information at the second application environment, listen, by the second application environment, for an issued communication from the first application environment for new launch-configuration information that is not synchronized between the first and the second application environments.

18. The multi-modal device of claim 17, wherein the instruction for changing the second docking bar includes an instruction changing a launcher object to include the change to the set of panels or the first docking bar, and the launcher object on the second docking bar is for launching a launchable object in the first application environment from the second application environment.

19. The multi-modal device of claim 18, wherein the instruction for changing the second docking bar includes instructions for removing the launcher object from the second docking bar, or adding the launcher object to the second docking bar, or altering the launcher object on the second docking bar.

* * * * *